United States Patent
Chavda et al.

(10) Patent No.: US 9,329,942 B2
(45) Date of Patent: *May 3, 2016

(54) OPTIMIZING RESTORATION OF DEDUPLICATED DATA

(71) Applicant: International Business Machines Corporation, Armonk, NY (US)

(72) Inventors: Kavita Chavda, Roswell, GA (US); Nagapramod S. Mandagere, San Jose, CA (US); Ramani R. Routray, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,814

(22) Filed: Jul. 18, 2014

(65) Prior Publication Data

US 2014/0330795 A1    Nov. 6, 2014

Related U.S. Application Data

(63) Continuation of application No. 13/610,929, filed on Sep. 12, 2012, now Pat. No. 8,849,851.

(51) Int. Cl.
  *G06F 17/30* (2006.01)
  *G06F 11/14* (2006.01)

(52) U.S. Cl.
  CPC ........ *G06F 11/1453* (2013.01); *G06F 11/1469* (2013.01); *G06F 17/3015* (2013.01); *G06F 17/30194* (2013.01)

(58) Field of Classification Search
  CPC ............. G06F 17/30; G06F 17/30958; G06F 11/1453; G06F 17/3015
  See application file for complete search history.

(56) References Cited

U.S. PATENT DOCUMENTS

| | | | |
|---|---|---|---|
| 7,373,389 B2 | 5/2008 | Rosenbaum et al. | |
| 7,739,653 B2 * | 6/2010 | Venolia | G06F 17/30958 717/101 |
| 8,595,262 B1 | 11/2013 | Hayden | |
| 8,849,851 B2 | 9/2014 | Chavda et al. | |
| 2007/0011659 A1 | 1/2007 | Venolia | |
| 2008/0016115 A1 * | 1/2008 | Bahl | H04L 41/22 |
| 2009/0027392 A1 | 1/2009 | Jadhav et al. | |
| 2010/0050051 A1 * | 2/2010 | Song | H04L 1/0075 714/762 |

(Continued)

OTHER PUBLICATIONS

Constantinescu. "Compression for Data Archiving and Backup Revisited". Proceeding of SPIE vol. 7444, Mathematics for Signal and Information Processing, 74440C. Copyright 2009. doi:10.1117/12.825361.

*Primary Examiner* — Alex Gofman
*Assistant Examiner* — Merilyn Nguyen
(74) *Attorney, Agent, or Firm* — Trentice V. Bolar; Matthew H. Chung

(57) ABSTRACT

A computer identifies a plurality of data retrieval requests that may be serviced using a plurality of unique data chunks. The computer services the data retrieval requests by utilizing at least one of the unique data chunks. At least one of the unique data chunks is utilized for servicing two or more of the data retrieval requests. The computer determines a servicing sequence for the plurality of data retrieval requests such that the two or more of the data retrieval requests that are serviced utilizing the at least one of the unique data chunks are serviced consecutively. The computer services the plurality of data retrieval requests according to the servicing sequence.

18 Claims, 4 Drawing Sheets

(56) References Cited

U.S. PATENT DOCUMENTS

| | | |
|---|---|---|
| 2011/0060882 A1 | 3/2011 | Efstathopoulos |
| 2011/0218969 A1 | 9/2011 | Anglin et al. |
| 2012/0036249 A1 | 2/2012 | Chandrasekaran |
| 2012/0203640 A1 | 8/2012 | Karmarkar et al. |
| 2013/0055091 A1 | 2/2013 | Dutta et al. |
| 2013/0110784 A1* | 5/2013 | Guo et al. .................... 707/649 |
| 2013/0191416 A1* | 7/2013 | Lee .................. G06F 17/30979 707/771 |

* cited by examiner

OPTIMIZING RESTORATION OF DEDUPLICATED DATA

FIELD OF THE INVENTION

The present invention relates generally to data retrieval operations performed within a data storage system, and more particularly to techniques for optimizing the restoration of deduplicated data that is stored on a server within a data backup/archiving system.

BACKGROUND OF THE INVENTION

In a data backup/archiving system, there is usually significant redundancy among the stored data from different users or among the stored data from the same user. This redundancy leads to increased storage consumption in data backup/archive systems not designed to address the redundancy. Data deduplication is a common technique used to address redundancy and thereby reduce the storage consumption in data backup/archive systems. Deduplication can be performed on the backup/archiving system (server-side data deduplication) or on the client's computing device (client-side data deduplication).

Typically, in server-side data deduplication, large data objects of variable lengths, such as files, are partitioned into smaller data sets of a fixed length (data chunks), for the purpose of backup/archiving. Each unique data chunk has a unique identification tag generated by a hash function, for example SHA-1 or MD5. Only unique data chunks will be stored and the files or objects sharing this chunk will all refer to this copy. Typically, in client-side data deduplication, the backup/archiving client (client) and the server work together to identify duplicate data. Generally, client-side data deduplication is a three-phase process: the client creates the data chunks; the client and server work together to identify duplicate data chunks; and the client sends non-duplicate data chunks to the server for backup/archiving. The overall result of deduplication is a reduction is storage space requirements.

However, the storage reduction is not gained for free. When the user needs to get his or her data back from the server in a backup/archive system (data restore), the server needs to first construct the requested data files or objects from data chunks, and then send them back to the user (or client) through the network. For data retrieval requests received but not yet serviced, in which a data backup/archive system is asked to retrieve multiple data chunks, the retrieval process typically proceeds in the order the requests arrived in, wherein for each request the system locates all pieces required to service the request, and then transfers the pieces to the client. Such a conventional restore process imposes a heavy load on the data backup/archive system.

SUMMARY

Embodiments of the present invention provide a system, method, and program product for restoring deduplicated data. A computer identifies a plurality of data retrieval requests that may be serviced using a plurality of unique data chunks. The computer services the data retrieval requests by utilizing at least one of the unique data chunks. At least one of the unique data chunks is utilized for servicing two or more of the data retrieval requests. The computer determines a servicing sequence for the plurality of data retrieval requests such that the two or more of the data retrieval requests that are serviced utilizing the at least one of the unique data chunks are serviced consecutively. The computer services the plurality of data retrieval requests according to the servicing sequence.

DETAILED DESCRIPTION

Figure 1:
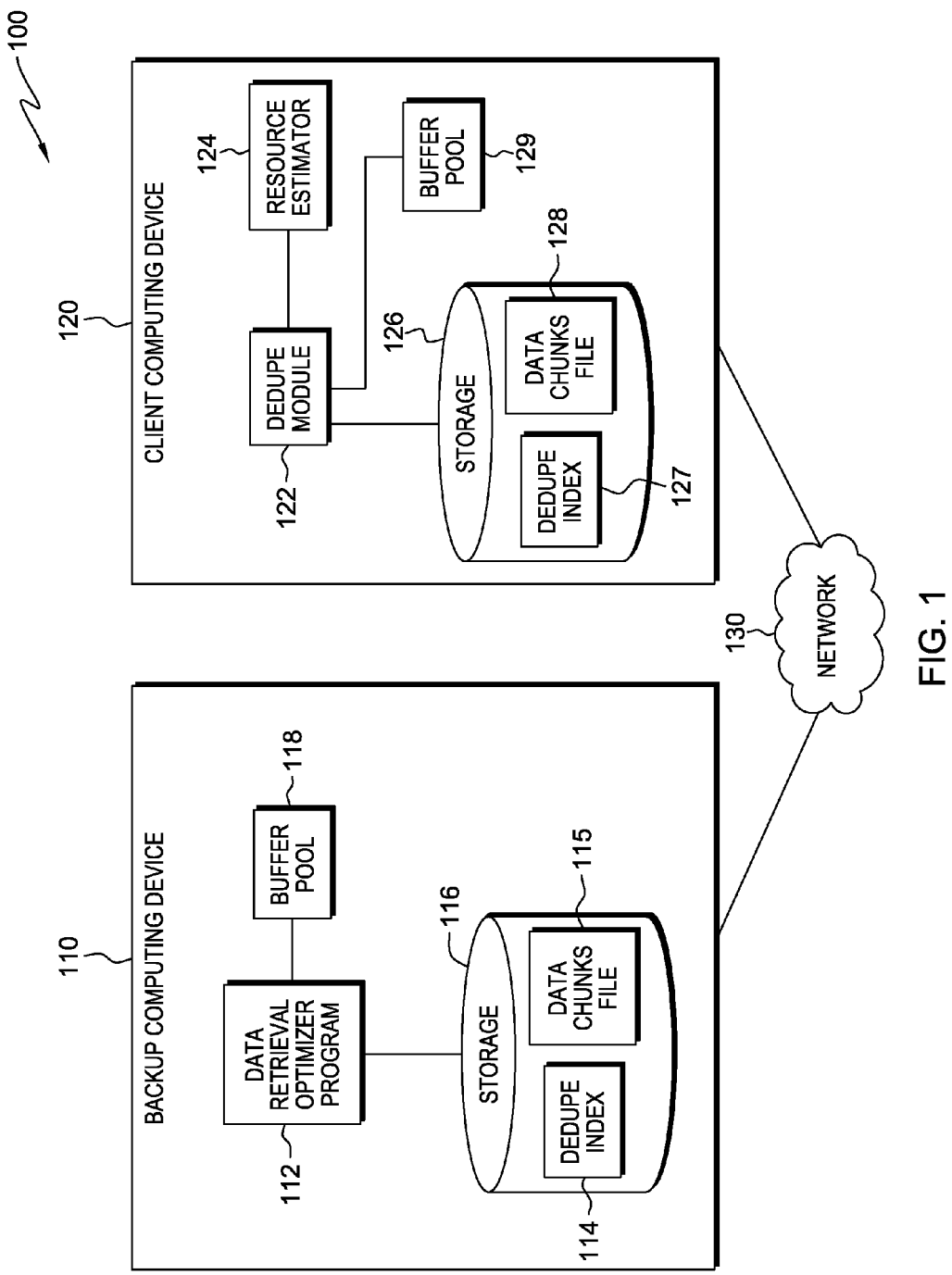
FIG. 1 is a functional block diagram illustrating a data retrieval environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating data retrieval environment 100 in accordance with one embodiment of the present invention. Data retrieval environment 100 includes backup computing device 110 and client computing device 120 interconnected over network 130. Network 130 can be, for example, a local area network (LAN), a wide area network (WAN) such as the Internet, or a combination of the two, and includes wired, wireless, or fiber optic connections. In general, network 130 can be any combination of connections and protocols that will support communications between backup computing device 110 and client computing device 120, in accordance with a desired embodiment of the invention. In embodiments of the invention, backup computing device 110 and client computing device 120 can each be a mainframe or mini computer, a laptop, tablet, or netbook personal computer (PC), or a desktop computer. In general, backup computing device 110 and client computing device 120 can each be any programmable electronic device capable of supporting the required functionality of an embodiment of the invention, and as described in further detail with respect to FIG. 4.

In a preferred embodiment of the invention, backup computing device 110 includes data retrieval optimizer program 112, storage 116, and buffer pool 118. Storage 116 stores data chunks file 115 and deduplication index 114. Data chunks file 115 stores unique data chunks, wherein each unique data chunk has a unique hash tag generated by a hash function, for example SHA-1 or MD5. Data objects stored on backup computing device 110 for later retrieval are divided into data chunks and stored in data chunks file 115; and data objects sharing a unique data chunk refer to a single unique copy of the stored data chunk. Data chunks stored in data chunks file 115 may also be present in data chunks file 128, as discussed in more detail below. Backup computing device 110 may include a deduplication module (not shown) that generates data chunks that can be stored in data chunks files 115. Deduplication index 114 includes information about the data chunks stored in data chunks file 115, including information about each data chunk's hash tag, length, file path, file attributes, chunk offset within storage 116, and general chunk mapping information (e.g. information describing data object composition). Data chunk hash tags stored in deduplication index 114 can be generated using the hash function used to generate the hash tags stored in deduplication index 127, in accordance with a preferred embodiment of the present invention. Typically, deduplication index 114 is generated by deduplication software, for example, deduplication module 122, during the deduplication and storage of data objects. In one embodiment, deduplication index 114 may reside on any computing device capable of communicating with client computing device 120 via network 130. In other embodiments, deduplication index 114 may include information generated by deduplication software that operates on several unique client computing devices.

Data retrieval optimizer program 112, the operation of which is explained in greater detail below with respect to FIG. 3, operates generally to service data retrieval requests transmitted by client computing device 120, and to transmit the requested data to client computing device 120, in accordance with a preferred embodiment of the invention. To service a data retrieval request, data retrieval optimizer program 112 can store and assemble, in buffer pool 118, a plurality of data chunks stored in data chunks file 115. Data retrieval optimizer program 112 can operate to service data retrieval requests including both data chunk retrieval requests and data object retrieval requests. To service a data retrieval request, data retrieval optimizer program 112 can read into buffer pool 118 a plurality of data chunks, stored in data chunks file 115, and publish the serviced data retrieval request to client computing device 120 as either a plurality of data chunks or as an assembled data object generated by combining a plurality of data chunks. In a preferred embodiment, data retrieval optimizer program 112 determines an optimized order (servicing sequence) to read data chunks stored in data chunks file 115 into buffer pool 118. For example, an optimized read order is one that minimizes the total number of data chunks that must be read into buffer pool 118 in order to service a plurality of data retrieval requests, as discussed in greater detail below.

In general, deduplication index 114 can be any data structure that allows for the efficient storing and organizing of data, that may be accessed by data retrieval optimizer program 112, and that allows data retrieval optimizer program 112 to service a plurality of data retrieval requests from a computing device, for example, client computing device 120. In preferred embodiments of the invention, storage 116 includes a hard disk unit that stores data chunks file 115 and deduplication index 114. In general, storage 116 can be any device, or combination of devices, that allows data chunks file 115 and deduplication index 114 to be stored within it and allows data retrieval optimizer program 112 to access it in order to service a plurality of data retrieval requests received from a computing device, for example, client computing device 120. In preferred embodiments of the invention, buffer pool 118 includes computer memory, such as memory 406, where data retrieval optimizer program 112 temporarily stores the data chunks that it reads from data chunks file 115 that are required to service the plurality of data retrieval requests received from client computing device 120. In general, buffer pool 118 may be any computer data storage device of finite capacity that allows data retrieval optimizer program 112 to assemble and store data objects as well as store data chunks.

In a preferred embodiment of the invention, client computing device 120 includes deduplication module 122, resource estimator 124, storage 126, and buffer pool 129. As discussed in more detail below, data objects of client computing device 120 may be deduplicated in client computing device 120 and their unique data chunks, relative to data chunks file 115, sent to backup computing device 110 for storage, or may be sent whole to backup computing device 110 for both deduplication and storage. Storage 126 stores data chunks file 128 and deduplication index 127. In general, storage 126 may store data objects, data chunks, and deduplication indices. Data chunks file 128 stores unique data chunks, wherein each unique data chunk has a unique hash tag generated by a hash function, for example SHA-1 or MD5. Deduplication module 122 divides data objects present on client computing device 120 into data chunks wherein the unique data chunks may be stored in data chunks file 128; data objects sharing a unique data chunk refer to a single unique copy of the stored data chunk, according to a preferred embodiment of the present invention. As discussed above, data chunks stored in data chunks file 128 may also be present in data chunks file 115. Deduplication index 127 includes information about the data chunks stored in data chunks file 128, for example, information about each data chunk's hash tag, length, file path, file attributes, and byte offset of the chunk within storage 126. As discussed above, the hash tags stored in deduplication index 127 can be generated using the same hash function used to generate the hash values stored in deduplication index 114, in accordance with a preferred embodiment of the invention. In general, deduplication index 127 is generated by deduplication software, for example, deduplication module 122, during the deduplication and storage of data objects. In one embodiment, deduplication index 127 may reside on any computing device capable of communicating with client computing device 120 via network 130. In other embodiments, deduplication index 114 may include information generated by deduplication software that operates on several unique client computing devices.

Resource estimator 124 monitors client-side resources, for example RAM and buffer pool 129, required to restore a data object within buffer pool 129 and determines whether an optimal restoration solution requires that the data object be restored on client computer device 120 (e.g., in the context of sending a data chunk restoration request to backup computing device 110) or on backup computing device 110 (e.g., in the context of sending a data object restoration request to backup computing device 110). For example, if resource estimator 124 determines that the time necessary to restore a data object client-side, for example, on client computing device 120, is too great, as compared to a server-side restoration, for example, on backup computing device 110, because an insufficient amount of client-side restoration resources are available, resource estimator 124 may request that the whole data object be restored at the computing device that stores the data object, for example, backup computing device 110. Resource estimator 124 is associated with deduplication module 122, in accordance to a preferred embodiment of the invention. In another embodiment, resource estimator 124 may reside on a computing device that communicates with client computing device 120. In a preferred embodiment of the invention, buffer pool 129 includes computer memory, such as RAM, where deduplication module 122 restores data objects using data chunks that were stored in data chunks file 115 or data chunks file 128, temporarily stores data chunks transmitted by data retrieval optimizer program 112 or data chunks read by deduplication module 122 from data chunks file 128 in order to restore a data object.

In preferred embodiments of the invention, deduplication module 122 operates generally to divide a data object into data chunks for storage, retrieve data chunks, and restore data objects. It is further the case that data chunks generated by deduplication module 122 need not be uniform in length and may be of variable length. Deduplication module 122 requests data chunks that are not present in storage 126 from backup computing device 110 and may restore data objects using both the transmitted data chunks retrieved from backup computing device 110 and the stored data chunks located in storage 126, in accordance with a preferred embodiment of the invention. Deduplication module 122 accesses resource estimator 124 and determines whether resources available to client computing device 120 are sufficient to support a client-side data object restoration that will occur in less time when compared to server-side data object restoration from backup computing device 110. Where client-side data object restoration is determined to be either faster or satisfy a service level agreement, deduplication module 122 accesses deduplication index 127, determines the location of data chunks required to service a data retrieval request, reads into buffer pool 129 the data chunks transmitted by data retrieval optimizer program 112 and the data chunks retrieved from storage 126 contained in data chunks file 128, and assembles the desired data object within buffer pool 129, according to a preferred embodiment of the invention. Where server-side data restoration is desired, deduplication module 122 transmits a data object restoration request to backup computing device 110 that signifies that the data object named in the data object restoration request is to be restored in buffer pool 118. Client-side data restoration and server-side data restoration are both discussed in detail below.

It is also the case that un-chunked data objects may be present client-side. In situations wherein client-side restoration of a data object is desired but only an older version of the un-chunked data object exists client-side, deduplication module 122 may divide the older data object present client-side into data chunks to determine the additional chunks required for restoration of the new version of the data object. Different versions of a data object may include data objects having a file name that is the same or similar. Deduplication module 122 may then send a request to data retrieval optimizer program 112 for those chunks that are necessary to restore the new version of the data object. Data retrieval optimizer program 112 then retrieves those missing data chunks, for example, data chunks file 115, from storage 116 and transmits them to client-computing device 120 wherein the missing chunks will be used to restore the data object.

Figure 2A:
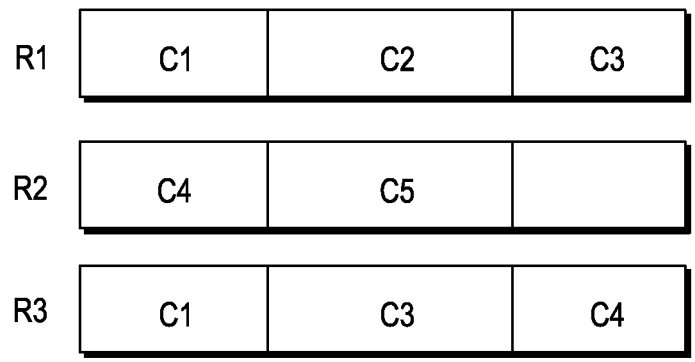
FIG. 2A illustrates an example of the data chunks contained in three un-serviced data retrieval requests, in accordance with an embodiment of the present invention.
Figure 2B:
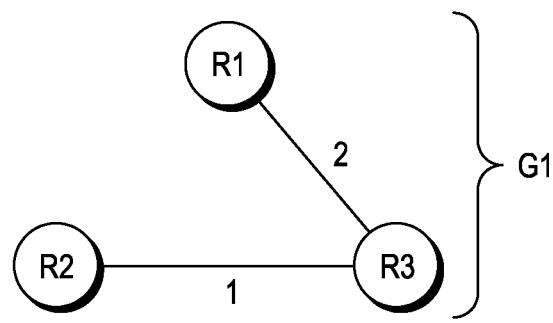
FIG. 2B illustrates a relationship graph constructed mapping from the three un-serviced data retrieval requests of FIG. 2A into a relationship graph, in accordance with an embodiment of the present invention.
Figure 2C:
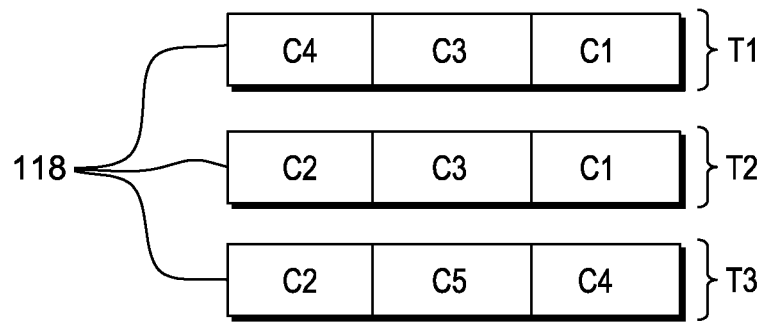
FIG. 2C illustrates a time-lapse progression of how the data chunks illustrated in FIG. 2A are read into buffer pool 118, in accordance with an embodiment of the present invention.

Turning now to FIGS. 2A, 2B, and 2C, FIG. 2A depicts three data objects R1, R2, and R3 and their corresponding data chunks. Data object R1 contains data chunks C1, C2, and C3; data object R2 contains chunks C4 and C5; and data object R3 contains chunks C1, C3, and C4. FIG. 2B depicts relationship graph G1, which can be generated based on the relationships between data objects R1, R2, and R3. FIG. 2C depicts a time-lapse progression of buffer pool 118 at times T1, T2, and T3 as data chunks necessary to restore data objects R1, R2, and R3 are retrieved based on an optimized read order derived from relationship graph G1 depicted in FIG. 2B. Concepts introduced in the following discussion of FIGS. 2A, 2B, and 2C will be used further in the discussion of FIG. 3, in the context of data retrieval environment 100 of FIG. 1.

Turning now to FIG. 2A, this figure illustrates an example of data chunks contained in three un-serviced data retrieval requests, in accordance with an embodiment of the present invention. Data chunk retrieval requests for data objects R1, R2, and R3 (the requests) are received by backup computing device 110, in the depicted arrival order, from client computing device 120, both depicted in FIG. 1. The requests were transmitted by client computing device 120 after it determined that the chunks necessary to restore data objects R1, R2, and R3 were not present in storage 126, and resource estimator 124 determined that there are sufficient available resources to support the restoration of data objects R1, R2, and R3 on client computing device 120. The unique data chunks that comprise data objects R1, R2, and R3 have previously been backed up from client computing device 120 to backup computing device 110. To formulate the requests, client computing device 120 accessed deduplication index 127 and determined the hash tags of the data chunks that data retrieval optimizer program 112 is required to retrieve from data chunks file 115 in order to restore data objects R1, R2, and R3 on client computing device 120. Cumulatively, the restoration of data objects R1, R2, and R3 by client computing device 120 will require that data chunks C1, C2, C3, C4, and C5 are retrieved from data chunks file 115 by data retrieval optimizer program 112.

FIG. 2B illustrates a relationship graph constructed from mapping the three un-serviced data retrieval requests of FIG. 2A into a relationship graph, in accordance with an embodiment of the present invention. Each node of relationship graph G1 represents a data object that is composed of data chunks, and each pair of data objects that share at least one data chunk share an edge. In a preferred embodiment, the weight of each edge is the total number of shared chunks between two nodes (in another embodiment, the weight of each edge is the total size of the shared chunk or chunks). Data object R3 shares two data chunks with data object R1, data chunks C1 and C3, which results in an edge between data object R3 and data object R1 with an edge weight of 2. Data object R3 also shares a data chunk with R2, data chunk C4, which results in an edge between data object R3 and data object R2 with an edge weight of 1. Data object R1 and data object R2 do not have any chunks in common, and so their nodes do not share an edge. In a slightly different example, if data object R3 and data object R2 did not share a data chunk, then the depicted edge between them would not exist in relationship graph G1. In that case, relationship graph G1 would be a disjointed graph. Nevertheless, the techniques discussed herein can still operate by, for example, treating each isolated subgraph of the disjoint graph as a separate relationship graph. As will be discussed in detail in the context of FIG. 3, data objects R1, R2, and R3 have their data chunks retrieved in an optimized read order based on their relationship score, for example, the total edge weight, total number of edges of the node, or the weighted sum of the total edge weight of the node and the total number of edges of the node, determined by data retrieval optimizer program 112 traversing relationship graph G1, starting from the node having the highest relationship score, in substantially breadth-first order according to descending relationship score.

FIG. 2C illustrates a time-lapse progression of how the data chunks illustrated in FIG. 2A are read into buffer pool 118, in accordance with an embodiment of the present invention. Buffer pool 118 is depicted in its entirety as containing three slots, wherein each slot represents a fixed amount of memory. The optimized read order in which data chunks C1, C2, C3, C4, and C5 are read into buffer pool 118 is C1, C3, C4, C2, C4, and C5. The derivation of the optimized read order will be discussed in detail in the context of FIG. 3. According to the optimized read order, FIG. 2C depicts that at time T1, data retrieval optimizer program 112 reads data chunks C1, C3, and C4 into buffer pool 118, and transmits those data chunks to client computing device 120 where client computing device 120 restores data object R3. At time T2, data retrieval optimizer program 112 removes data chunk C4 from buffer pool 118, reads data chunk C2 into buffer pool 118, and transmits data chunks C1, C3, and C2 to client computing device 120 where client computing device 120 restores data object R1. At time T3, data retrieval optimizer program 112 removes data chunks C1 and C3 from buffer pool 118, reads in data chunks C4 and C5, and transmits the read data chunks to client computing device 120 where client computing device 120 restores data object R2. By following the optimized read order, data retrieval optimizer program 112 preserves data chunks C1 and C3 in buffer pool 118 between times T1 and T2, whereas if data objects R1, R2, and R3 were restored in the arrival order, no such preservation would have been possible. The preservation of data chunks in buffer pool 118 is discussed in detail below.

Figure 3:
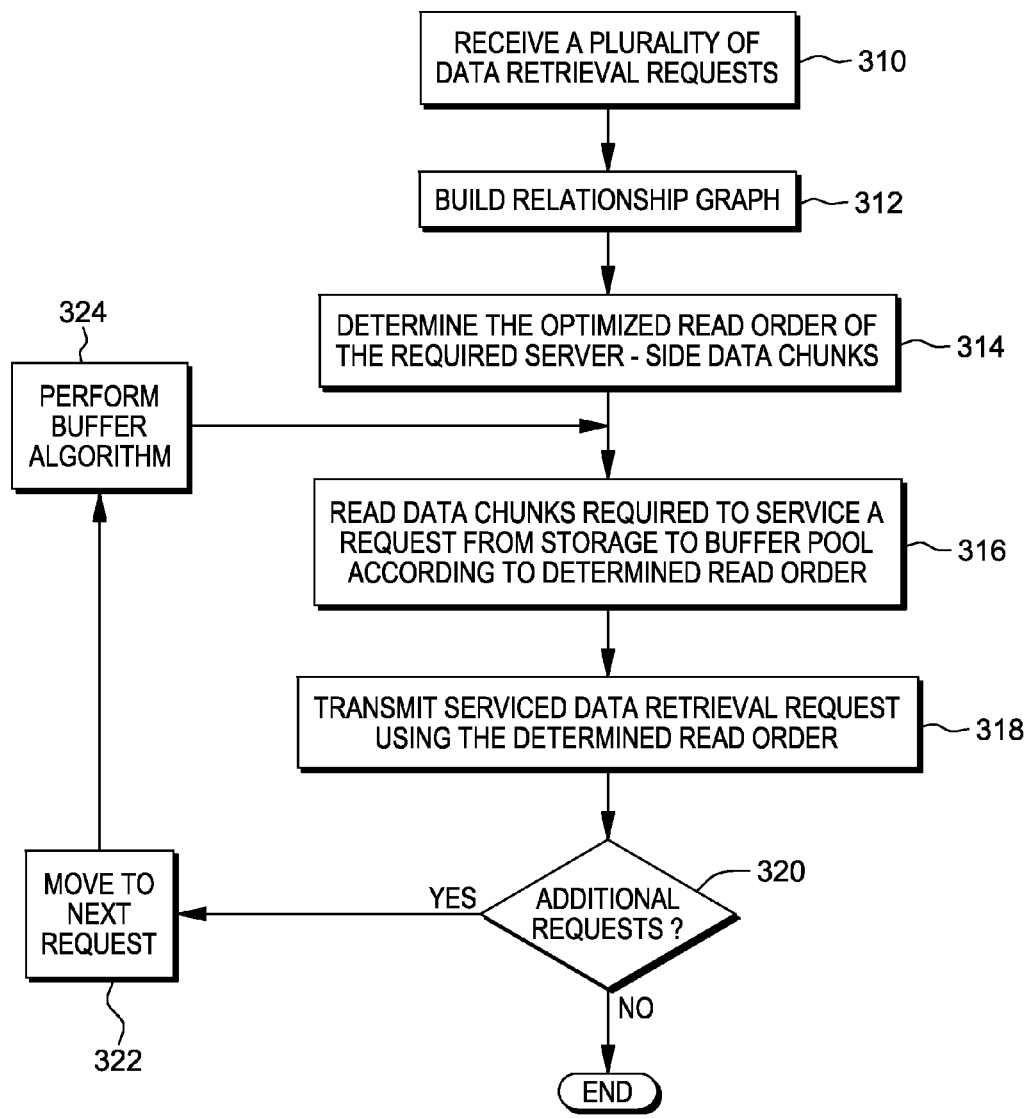
FIG. 3 is a flowchart depicting the operational steps of a data retrieval optimizer program, on a backup computing device within the data retrieval environment of FIG. 1, for retrieving data in an optimized manner, in accordance with an embodiment of the present invention.

FIG. 3 is a flowchart depicting the operational steps of data retrieval optimizer program 112, on backup computing device 110 within data retrieval environment 100 of FIG. 1. Data retrieval optimizer program 112 receives data retrieval requests from client computing device 120, which accesses deduplication index 127 in order to determine the data chunks required to service the data retrieval requests. Using data chunk information derived from deduplication index 127, deduplication module 122 generates three data retrieval requests and transmits the plurality of data retrieval requests to data retrieval optimizer program 112. Data retrieval optimizer program 112 receives the plurality of data retrieval requests sent by client computing device 120 (step 310) and builds relationship graph G1 for the three data retrieval requests in which each node represents a data object (step 312). If two data objects share at least one data chunk, there will be an edge between the two objects (nodes). The weight of the edge will be the total number of chunks shared between the two nodes. Relationship graph G1 can be stored as a data structure in a memory of backup computing device 110. The data structure can be any graph data structure, for example, an adjacency matrix, adjacency list, or an incidence list. See above for a discussion of the structure of the resulting relationship graph in FIG. 2B.

After building relationship graph G1, data retrieval optimizer program 112 determines the optimized read order of the required server-side data chunks (step 314). As discussed above in the context of FIG. 2B, data retrieval optimizer program 112 uses relationship graph G1 to determine that the data chunk retrieval request for R3 should be serviced first, followed by the data chunk retrieval request for R1, and then the data chunk retrieval request for data object R2 should be serviced last. In order to determine the optimized read order, data retrieval optimizer program 112 first determines which node has the highest number of shared data chunks (root node) and tags the root node as being in position number one of the optimized read order (notably, if the relationship graph G1 is a disjoint graph, then a separate root node can be determined for each isolated subgraph of the disjoint graph). Next, beginning with the root node, data retrieval optimizer program 112 searches relationship graph G1 in a breadth-first fashion wherein each node's neighbor that is not already in the optimized read order is inserted in the optimized read order in descending order of each node's maximum number of shared data chunks (total edge weight). The optimized read order may also be based on other criteria, for example, the total number of shared data chunks that a node has (total number of edges), and the weighted sum of a node's total edge weight and total number of edges.

After determining the optimized read order of the required server-side data chunks, for each data retrieval request data retrieval optimizer program 112 reads data chunks stored in data chunks file 115 to buffer pool 118 according to the determined optimized read order (step 316), transmits the read data chunks for the serviced data retrieval request to deduplication module 122 (step 318), determines that there are additional data retrieval requests (yes branch of decisional 320), and moves to an additional data retrieval request to begin to service the additional data retrieval request (step 322). For example, to service the first data retrieval request of the optimized read order, data retrieval optimizer program 112 accesses deduplication index 114, and using the information contained in the data retrieval requests, for example, the hash tag for a given data chunk, reads data chunks C1, C3, and C4 from data chunks file 115 in to buffer pool 118 (at time T1 of FIG. 2C) (step 316) and transmits the read data chunks to deduplication module 122 (step 318), where the transmitted data chunks are read into buffer pool 129 by deduplication module 122 to restore data object R3. To continue the example, to service the data retrieval request for the data chunks required to restore data object R1, data retrieval optimizer program 112 determines that there is a second data retrieval request (yes branch of decisional step 320), initiates processing of the second data retrieval request (step 322), performs a buffer algorithm wherein data retrieval optimizer program 112 removes data chunk C4 from buffer pool 118 because data chunk C4 is not required to restore data object R1 (conversely, data chunks C1 and C3 are preserved in buffer pool 118 because they are required to restore data object R1) (step 324), reads data chunk C2, stored in data chunks file 115, into buffer pool 118 (at time T2 of FIG. 2C) (step 316), and transmits data chunks C1, C3, and C2 to deduplication module 122 (step 318), which reads them into buffer pool 129 to restore data object R1. Lastly, data retrieval optimizer program 112 determines that there is a third retrieval request (yes branch of decisional step 320), initiates processing of the third retrieval request (step 322), removes data chunks C1 and C3 from buffer pool 118 because those chunks are not necessary to restore data object R2 (data chunk C2 is allowed to remain in buffer pool 118, even though it is not necessary to preserve it for the restoration of data object R2, because removing data chunk C2 would incur unnecessary overhead)(step 324), reads data chunks C4 and C5, stored in data chunks file 115, into buffer pool 118 (at time T3 of FIG. 2C) (step 316), and transmits data chunks C4 and C5 to deduplication module 122 (step 318), which reads them into buffer pool 129 to restore data object R2.

Figure 4:
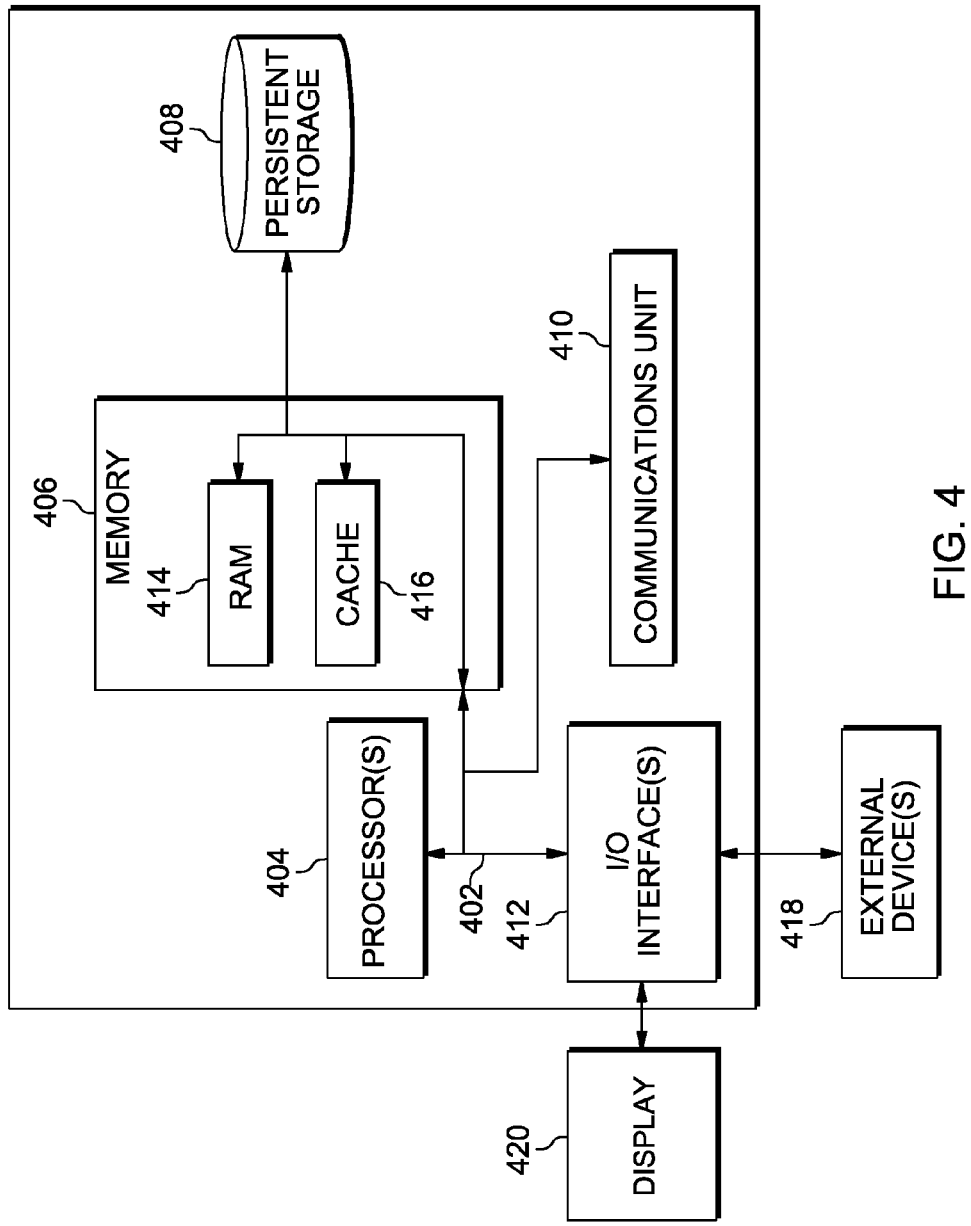
FIG. 4 depicts a block diagram of components of the backup computing device and/or the client computing device of FIG. 1, in accordance with an embodiment of the present invention.

FIG. 4 depicts a block diagram of components of the backup computing device and/or the client computing device, in accordance with an embodiment of the present invention.

It should be appreciated that FIG. 4 provides only an illustration of one implementation and does not imply any limitations with regard to the environment in which different embodiments may be implemented. Many modifications to the depicted environment may be made.

Backup computing device 110 and/or client computing device 120 includes communications fabric 402, which provides communications between computer processor(s) 404, memory 406, persistent storage 408, communications unit 410, and input/output (I/O) interface(s) 412.

Memory 406 and persistent storage 408 are examples of computer-readable tangible storage devices and media. Memory 406 may be, for example, one or more random access memories (RAM) 414, cache memory 416, or any other suitable volatile or non-volatile storage device.

Data retrieval optimizer program 112 and/or deduplication module 122 and resource estimator 124 are stored in persistent storage 408 for execution by one or more of the respective computer processors 404 via one or more memories of memory 406. Further, storage 116 and storage 126 are stored in persistent storage 408. In the embodiment illustrated in FIG. 4, persistent storage 408 includes flash memory. Alternatively, or in addition to flash memory, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices, including communications between client computing device 120 and backup computing device 110 via network 130. In these examples, communications unit 410 includes one or more network interface cards. Communications unit 410 may provide communications through the use of either or both physical and wireless communications links. Data retrieval optimizer program 112 and/or deduplication module 122 and resource estimator 124 may be downloaded to persistent storage 408 through communications unit 410.

I/O interface(s) 412 allows for input and output of data with other devices that may be connected to backup computing device 110 and/or client computing device 120. For example, I/O interface 412 may provide a connection to external devices 418 such as a keyboard, keypad, a touch screen, and/or some other suitable input device. I/O interface(s) may also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising the steps of:
    a first computing device identifying a plurality of data retrieval requests for servicing with a plurality of unique data chunks, wherein each data retrieval request is serviced utilizing at least one of the unique data chunks, and wherein at least a first unique data chunk is utilized for the servicing of both a first data retrieval request and a second data retrieval request;
    the first computing device determining a servicing sequence of the plurality of data retrieval requests such that the first and the second data retrieval requests are serviced consecutively; and
    the first computing device servicing the plurality of data retrieval requests according to the servicing sequence;
    wherein:
    determining the servicing sequence is based, at least in part, on determining that the first unique data chunk is common to servicing both the first and the second data retrieval requests;
    determining the servicing sequence is based, at least in part, on using a relationship graph, which the relationship graph including nodes and edges connecting the nodes, and which each edge having a weight;
    each node of the relationship graph corresponds to a data retrieval request of the plurality of data retrieval requests; and
    the weight of an edge connecting two nodes is based, at least in part, on a measure of data common to servicing the data retrieval requests corresponding to the two nodes.

2. The method of claim 1 wherein the measure of data is based, at least in part, on whether and/or how many unique data chunks are common to servicing the data retrieval requests corresponding to the two nodes.

3. The method of claim 1 wherein the measure of data is based, at least in part, on the total size of the unique data chunks common to servicing the data retrieval requests corresponding to the two nodes.

4. The method of claim 1 wherein using the relationship graph includes determining a relationship score for each node in the relationship graph.

5. The method of claim 4 wherein the relationship score for a node is based, at least in part, on total edge weight of all edges of the node.

6. The method of claim 4 wherein:
    a node having a relationship score at least as high as any other node in the relationship graph is designated a root node and inserted into the servicing sequence;
    the relationship graph is searched in a substantially breadth-first fashion beginning at the root node; and
    each node's neighboring node not already in the servicing sequence is inserted into the servicing sequence in descending order of each node's relationship score.

7. A computer program product comprising:
    one or more computer-readable hardware storage device(s) and program instructions stored on the one or more computer-readable hardware storage device(s), the program instructions comprising:
    program instructions to identify a plurality of data retrieval requests for servicing with a plurality of unique data chunks, wherein each data retrieval request is serviced utilizing at least one of the unique data chunks, and wherein at least a first unique data chunk is utilized for the servicing of both a first data retrieval request and a second data retrieval request;
    program instructions to a servicing sequence of the plurality of data retrieval requests such that the first and the second data retrieval requests are serviced consecutively; and
    program instructions to service the plurality of data retrieval requests according to the servicing sequence;
    wherein:
    determining the servicing sequence is based, at least in part, on determining that the first unique data chunk is common to servicing both the first and the second data retrieval requests;
    determining the servicing sequence is based, at least in part, on using a relationship graph, which the relationship graph including nodes and edges connecting the nodes, and which each edge having a weight;
    each node of the relationship graph corresponds to a data retrieval request of the plurality of data retrieval requests; and
    the weight of an edge connecting two nodes is based, at least in part, on a measure of data common to servicing the data retrieval requests corresponding to the two nodes.

8. The product of claim 7 wherein the measure of data is based, at least in part, on whether and/or how many unique data chunks are common to servicing the data retrieval requests corresponding to the two nodes.

9. The product of claim 7 wherein the measure of data is based, at least in part, on the total size of the unique data chunks common to servicing the data retrieval requests corresponding to the two nodes.

10. The product of claim 7 wherein using the relationship graph includes determining a relationship score for each node in the relationship graph.

11. The product of claim 10 wherein the relationship score for a node is based, at least in part, on total edge weight of all edges of the node.

12. The product of claim 10 wherein:
    a node having a relationship score at least as high as any other node in the relationship graph is designated a root node and inserted into the servicing sequence;

the relationship graph is searched in a substantially breadth-first fashion beginning at the root node; and each node's neighboring node not already in the servicing sequence is inserted into the servicing sequence in descending order of each node's relationship score.

13. A computer system comprising:

one or more computer processors;

one or more computer-readable storage media;

program instructions stored on the computer-readable storage media for execution by at least one of the one or more processors, the program instructions comprising:

program instructions to identify a plurality of data retrieval requests for servicing with a plurality of unique data chunks, wherein each data retrieval request is serviced utilizing at least one of the unique data chunks, and wherein at least a first unique data chunk is utilized for the servicing of both a first data retrieval request and a second data retrieval request;

program instructions to a servicing sequence of the plurality of data retrieval requests such that the first and the second data retrieval requests are serviced consecutively; and program instructions to service the plurality of data retrieval requests according to the servicing sequence;

wherein:

determining the servicing sequence is based, at least in part, on determining that the first unique data chunk is common to servicing both the first and the second data retrieval requests;

determining the servicing sequence is based, at least in part, on using a relationship graph, which the relationship graph including nodes and edges connecting the nodes, and which each edge having a weight;

each node of the relationship graph corresponds to a data retrieval request of the plurality of data retrieval requests; and the weight of an edge connecting two nodes is based, at least in part, on a measure of data common to servicing the data retrieval requests corresponding to the two nodes.

14. The system of claim 13 wherein the measure of data is based, at least in part, on whether and/or how many unique data chunks are common to servicing the data retrieval requests corresponding to the two nodes.

15. The system of claim 13 wherein the measure of data is based, at least in part, on the total size of the unique data chunks common to servicing the data retrieval requests corresponding to the two nodes.

16. The system of claim 13 wherein using the relationship graph includes determining a relationship score for each node in the relationship graph.

17. The system of claim 16 wherein the relationship score for a node is based, at least in part, on total edge weight of all edges of the node.

18. The system of claim 16 wherein:

a node having a relationship score at least as high as any other node in the relationship graph is designated a root node and inserted into the servicing sequence;

the relationship graph is searched in a substantially breadth-first fashion beginning at the root node; and each node's neighboring node not already in the servicing sequence is inserted into the servicing sequence in descending order of each node's relationship score.

* * * * *